United States Patent
Grünbeck

(10) Patent No.: US 12,259,291 B2
(45) Date of Patent: Mar. 25, 2025

(54) METHOD AND DEVICE FOR DETERMINING AN AMPLITUDE OF A PUMP-INDUCED FLUID PRESSURE FLUCTUATION OF A FLUID

(71) Applicant: MAN Truck & Bus SE, Munich (DE)

(72) Inventor: Thomas Grünbeck, Munich (DE)

(73) Assignee: MAN Truck &Bus SE, Munich (DE)

( * ) Notice: Subject to any disclaimer, the term of this patent is extended or adjusted under 35 U.S.C. 154(b) by 668 days.

(21) Appl. No.: 17/615,804

(22) PCT Filed: May 26, 2020

(86) PCT No.: PCT/EP2020/064554
§ 371 (c)(1),
(2) Date: Dec. 1, 2021

(87) PCT Pub. No.: WO2020/244965
PCT Pub. Date: Dec. 10, 2020

(65) Prior Publication Data
US 2022/0326106 A1 Oct. 13, 2022

(30) Foreign Application Priority Data
Jun. 1, 2019 (DE) ...................... 10 2019 003 920.3

(51) Int. Cl.
*G01L 23/26* (2006.01)
(52) U.S. Cl.
CPC .................................. *G01L 23/26* (2013.01)
(58) Field of Classification Search
CPC ........ G01L 23/26; F04B 49/065; F04B 49/08; F04B 13/00; F04B 51/00; F01N 11/00; F01N 3/2066; F01N 13/00
See application file for complete search history.

(56) References Cited

U.S. PATENT DOCUMENTS 7,635,854 B1 * 12/2009 Babin ................. G01F 23/2928
250/573
2013/0048096 A1 2/2013 Raeymaeckers et al.
(Continued)

FOREIGN PATENT DOCUMENTS

DE 102012218092 A1 4/2014
DE 102013218897 A1 3/2015
(Continued)

OTHER PUBLICATIONS

English Machine Translation of Rys, DE 10 2014 222 739 A1, May 12, 2016, Translated online Aug. 2024 (Year: 2016).*
(Continued)

*Primary Examiner* — David Z Huang
(74) *Attorney, Agent, or Firm* — Weber Rosselli & Cannon LLP

(57) ABSTRACT

The invention relates to a method for determining an amplitude A of a pump-induced fluid pressure fluctuation of a fluid which is regulated to a desired fluid pressure $p_{soll}$ by means of a pump. In this case, the method comprises providing (S1) a pressure signal of the fluid, determining (S2) the amplitude A of the fluid pressure fluctuation on the basis of the pressure signal which has been provided, checking (S3) whether the pressure signal which has been provided satisfies a predetermined plausibility criterion, and outputting or rejecting (S4) the determined amplitude A on the basis of whether the pressure signal which has been provided satisfies the predetermined plausibility criterion. This advantageously provides a combined method in which, in addition to fundamentally determining the amplitude A of a fluid pressure fluctuation, a plausibility check is also carried out immediately in order to determine whether this fluid pressure fluctuation also actually corresponds to a representative value for the current system state. Furthermore, the invention also relates to a device which is designed to carry out
(Continued)

the above-mentioned method and to a motor vehicle having a corresponding device.

24 Claims, 5 Drawing Sheets

(56) References Cited

U.S. PATENT DOCUMENTS

2013/0269418 A1   10/2013   Peucat et al.
2016/0053655 A1    2/2016   Tsutsumi

FOREIGN PATENT DOCUMENTS

| DE | 102014222739 A1 | 5/2016 |
| DE | 102015208416 | 5/2016 |
| EP | 2384138 A2 | 11/2011 |
| EP | 2126304 B1 | 5/2013 |

OTHER PUBLICATIONS

Brazilian Office Action issued in Brazilian Patent Application No. BR112021019671-4 dated Apr. 15, 2024 with English translation.
German search report issued in German Patent Application No. 102019003920.3 dated Feb. 26, 2020. English translation not available.
International Search Report and Written Opinion issued in PCT/EP2020/064554 dated Sep. 14, 2020 with English translation, 22 pages.

\* cited by examiner

METHOD AND DEVICE FOR DETERMINING AN AMPLITUDE OF A PUMP-INDUCED FLUID PRESSURE FLUCTUATION OF A FLUID

CROSS-REFERENCE TO RELATED APPLICATIONS

This application is a 371 application of PCT/EP2020/064554 filed May 26, 2020, which claims benefit of and priority to German Patent Application Serial No. DE102019003920.3 filed Jun. 1, 2019, the disclosures of the above-identified applications are hereby incorporated by reference in their entirety.

The present disclosure relates to a method for determining an amplitude of a pump-induced fluid pressure fluctuation of a fluid that is regulated by means of pump to a target fluid pressure $p_{soll}$. Moreover, the present disclosure relates to an apparatus that is particularly configured to perform this method, and a motor vehicle having a corresponding apparatus.

In order to reduce the $NO_x$ emissions of internal combustion engines, in particular of diesel internal combustion engines, nowadays SCR catalytic converters are frequently used for exhaust gas aftertreatment. By means of systems of this type, the nitrogen oxides contained in the exhaust gas are reduced to nitrogen using ammonia as a reducing agent and for this purpose, ammonia or an ammonia-releasing substance (for example aqueous urea solution) is added to the exhaust gas flow by way of suitable metering devices.

As a rule, the reducing agent that is stored in a storage tank is conveyed in this case by way of a pump to one or more metering valves and also brought to a predetermined metering pressure. This can for example be defined as a function of an operating variable of the internal combustion engine (for example the prevailing rotational speed) and/or a parameter of the exhaust gas (for example the prevailing exhaust gas temperature) and can be maintained at a constant as possible pressure level (for example by regulating the pump rotational speed).

Due to this regulation procedure, and in particular due to the—mostly periodic—pump movements, the pressure in the metering system is subjected to variations (for example in the form of pressure oscillations), which allow conclusions to be drawn regarding the rigidity of the hydraulic system and can thus be used for diagnostic purposes. Accordingly, there is a need in this context for a method which enables a precise determination or determination of the size of such pump-induced pressure fluctuations, in other words in particular the amplitude of such pump-induced pressure fluctuations.

However, the aforementioned procedure of determining the amplitude is impaired in the actual operation by a number of interfering influences, including for example bouncing effects and/or fluctuations in the regulation procedure, so that a determined amplitude value often does not have to represent the actual state in the system. Since the procedure of determining the amplitude can accordingly be designed as non-trivial, there is in particular a need in this context for a solution for determining the amplitude by means of which obvious irregularities or inaccuracies in the amplitude determination procedure can be recognized immediately. Moreover, a solution of this type is to be implemented in a simple and cost-effective manner.

These objects are achieved by virtue of a method, an apparatus and a motor vehicle having the features of the independent claims. Advantageous embodiments and applications of the present disclosure are the subject of the dependent claims and are further explained in detail in the following description with reference in part to the figures.

A method is provided according to a first independent solution approach. In this case, the method is suitable for determining an amplitude A of a pump-induced, preferably periodic, fluid pressure fluctuation of a fluid which is regulated by means of a pump, for example is regulated by way of varying the pump speed, to a target fluid pressure $p_{soll}$. A dynamic, preferably periodic, change in the fluid pressure about a center of gravity (for example $p_{soll}$) that is caused by the operation of the pump can be understood in this context as a pump-induced fluid pressure fluctuation—also referred to as fluid pressure variation and/or fluid pressure fluctuation. Thus, the pump-induced fluid pressure fluctuation can be for example a sinusoidal fluid pressure oscillation. The amplitude A in this case is to be preferably a measure for the variable of this fluctuation.

To this end, the method includes the step of providing a pressure signal that comprises a plurality of pressure signal values in a predetermined, in other words previously specified, time interval. In this case, the pressure signal can be a fluid pressure of the fluid, preferably on the pump output side, and/or a variable from which the aforementioned fluid pressure of the fluid, preferably on the pump output side, can be derived. The procedure of providing the pressure signal can furthermore also include detecting, preferably quasi-simultaneously detecting, the pressure signal. In addition or alternatively, the procedure of providing said pressure signal can also include receiving the pressure signal by means of a corresponding receiving device and/or reading out the pressure signal from a memory storage device. Moreover, the pressure signal can be either an analogue or digital pressure signal.

Furthermore, the method includes the step of determining the amplitude A of the pump-induced fluid pressure fluctuation on the basis of the provided pressure signal. This can take place, for example, on the basis of a difference between a maximum pressure signal value $D_{max}$ and a minimum pressure signal value $D_{min}$ of the provided pressure signal. In addition or alternatively, the amplitude A can also be determined on the basis of a deviation or difference with respect to a local or global arithmetic mean value or with respect to a center of gravity of the provided pressure signal. In this context, the procedure of determining the amplitude A can also be referred to as determining an amplitude estimated value and/or determining a preliminary amplitude, since—as described below—a plausibility check is moreover also to be carried out prior to finally outputting the determined amplitude (estimated) value.

For this purpose, the method includes the step of checking whether the provided pressure signal satisfies a predetermined plausibility criterion. Accordingly, the checking procedure can also be referred to as a validation and/or a plausibility check. The plausibility criterion preferably characterizes a quasi-stationary state (for example a state in which the pressure signal fluctuates around a quasi-stationary level). For this purpose, the predetermined, in other words previously defined, plausibility criterion can include, for example, exceeding and/or being below a predetermined pressure signal threshold value and/or adherence to a specific pressure signal value range. In other words, the predetermined plausibility criterion can also be understood as a condition that must be satisfied so that the pressure signal is in principle suitable for determining the amplitude and/or must be satisfied so that the determined amplitude A can actually be used as a representative value for the system rigidity. For example, the predetermined plausibility criterion can also include the condition as to whether the pressure signal S has just not been recorded during a metering process that greatly falsifies the pressure curve. In other words, failure to satisfy the plausibility criterion can enable obvious inaccuracies in the determination of the amplitude to be recognized.

If the provided pressure signal satisfies the predetermined plausibility criterion, the determined amplitude A is to be finally output. The output of said determined amplitude, which can also be referred to as providing said determined amplitude, can include optical displaying, generating an (for example electronic) amplitude signal and/or storing the determined amplitude A in a memory storage device. If, on the other hand, the provided pressure signal does not satisfy the predetermined plausibility criterion, the determined amplitude A is to be rejected, in other words said determined amplitude is not output.

Overall, the aforementioned method can thus be understood as a two-stage or combined method in which fundamentally, in addition to determining the amplitude A of a pump-induced fluid pressure fluctuation, a plausibility check also takes place as to whether this actually represents a representative value for the prevailing system state. As a result, the overall reliability in determining the amplitude is advantageously increased. Furthermore, the aforementioned amplitude determination can advantageously form the basis for a further diagnosis of the fluid system, since the amplitude A can provide information regarding the rigidity of the system and thus information regarding the presence of possible leaks etc.

According to a first aspect of the present disclosure, the aforementioned fluid can be a reducing agent for exhaust gas aftertreatment. For example, the fluid can be ammonia and/or aqueous urea solution. In general, however, the method in accordance with the present disclosure is suitable for any fluids, in other words gases, liquids, gas-liquid mixtures and/or liquids with a small proportion of solid material. Accordingly, the method can thus also be used, for example, in connection with an oil, fuel or cooling water pump.

In addition or alternatively, the pump-induced fluid pressure fluctuation can also be a periodic and/or sinusoidal fluid pressure oscillation caused by the operation of the pump. This can be caused, for example, by a regular rotary movement of a rotor (for example in the case of rotary vane pumps) or an oscillating movement of a piston (for example in the case of diaphragm pumps).

In addition or alternatively, the method can—for example as a further step—also include determining the rigidity of a system on the basis of the determined and/or output amplitude A. In this case, this can likewise be output. The system rigidity, which can also be referred to as hydraulic and/or mechanical system rigidity, can then for example also be used for diagnostic purposes, wherein the calculation of which can be carried out using methods or models familiar to the person skilled in the art. As a consequence, it is rendered possible in an advantageous manner to reliably monitor the fluid system, for example, with regard to possible leaks, etc.

According to a further aspect of the present disclosure, the step of determining the amplitude A can include determining a maximum and minimum pressure signal value $D_{max}$ and $D_{min}$ of the provided pressure signal within a first, preferably previously defined, time segment $t_1$ of the predetermined time interval. In other words, the largest and smallest pressure signal value is to be determined within the first time segment $t_1$ of the pressure signal. Preferably, the first time segment $t_1$ is in this case a real subset of the predetermined time interval of the pressure signal, for example its first half. Furthermore, the amplitude A can then be calculated on the basis of the determined maximum and minimum pressure signal values $D_{max}$ and $D_{min}$. For example, the amplitude A that can also be described as the fluctuation range can be defined as $A=|D_{max}-D_{min}|/2$. Alternatively, however, other calculation rules, such as for example the geometric mean of $D_{max}$ and $D_{min}$ can also be used, wherein in addition, conversion, weighting and/or correction factors that are familiar to the person skilled in the art can also be used.

Furthermore, the checking procedure can also include determining a first number $N_1$ of pressure signal values which lie within a second time segment $t_2$—that preferably follows the first time segment $t_1$—in a predetermined first pressure band $\Delta_1$ around the maximum pressure signal value $D_{max}$. A "pressure band"—also referred to as a tolerance range—can be understood in this context as a defined pressure range around the maximum pressure signal value $D_{max}$, which can be defined by a certain width and/or an upper and a lower pressure band limit value. Furthermore, the second time segment $t_2$ can be, for example, the second half of the predetermined time interval of the pressure signal. Thus, for example initially in a first time segment $t_1$, of for example 0.5 s, $D_{max}$ and $D_{min}$ can have determined and then in the subsequent next 0.5 s (=time segment $t_2$) $N_1$ are determined. The amplitude A is preferably only to be output if the determined first number $N_1$ exceeds a first, preferably predetermined, threshold value $S_1$ (for example $S_1=3$). In other words, the provided pressure signal is to satisfy the predetermined plausibility criterion if the first number $N_1$ exceeds a first threshold value $S_1$. It is preferred that the plausibility criterion is otherwise not to be satisfied.

In addition or alternatively, the checking procedure can also include determining a second number $N_2$ of pressure signal values which lie within the second time segment $t_2$ in a predetermined second pressure band $\Delta_2$ around the minimum pressure signal value $D_{min}$. Here, too, the expression "pressure band" is in turn to denote a defined pressure range around the minimum pressure signal value $D_{min}$, which can be defined by a certain width and/or an upper and a lower pressure band limit value. The amplitude A is preferably only then to be output if the determined second number $N_2$ exceeds a second, preferably likewise predetermined, threshold value $S_2$ (for example $S_2=3$). In other words, the provided pressure signal is to satisfy the predetermined plausibility criterion if the second number $N_2$ exceeds a second threshold value $S_2$. It is preferred that the plausibility criterion is also otherwise not to be satisfied here. In this case, the above-mentioned, preferably previously defined, time segments $t_1$ and $t_2$ of the pressure signal can either be of the same length or else have a different length. Thus, for example, the first time segment $t_1$ can be shorter than the second time segment $t_2$. Moreover, the second time segment $t_2$ can directly adjoin the first time segment $t_1$, or can begin with a temporal interval from the first time segment $t_1$. In an advantageous manner, this provides an easy-to-implement possibility for performing a plausibility check as to whether a quasi-stationary state is present, as a result of which the overall reliability of the determination procedure of a representative amplitude value is increased.

In order to further increase this reliability in an advantageous manner, the checking procedure can also include determining whether within the second time segment $t_2$ at least one pressure signal value lies above the predetermined first pressure band $\Delta_1$ around the maximum pressure signal value $D_{max}$. This means, in other words, that it can be checked whether within the second time segment $t_2$ a pressure signal value with a value greater than an upper pressure band limit value of the predetermined first pressure band $\Delta_1$ is present. If so, it is preferred that the amplitude A of the pump-induced fluid pressure fluctuation is not to be output. In other words, the provided pressure signal is to satisfy the predetermined plausibility criterion if no pressure signal value is above the predetermined first pressure band $\Delta_1$ around the maximum pressure signal value $D_{max}$.

In addition or alternatively, the checking procedure can also include determining whether within the second time segment $t_2$ at least one pressure signal value lies below the predetermined second pressure band $\Delta_2$ around the minimum pressure signal value $D_{min}$. In other words, it can be checked whether within the second time segment $t_2$ a pressure signal value with a value smaller than a lower pressure band limit value of the predetermined second pressure band $\Delta_2$ is present. If so, it is preferred that the amplitude A of the pump-induced fluid pressure fluctuation is also not to be output in this case. In other words, the provided pressure signal is to satisfy the predetermined plausibility criterion if no pressure signal value is below the predetermined second pressure band $\Delta_2$ around the minimum pressure signal value $D_{min}$.

Furthermore, according to a further aspect of the present disclosure, the predetermined first pressure band $\Delta_1$, which can also be referred to as the first tolerance range, can be centered around the maximum pressure signal value $D_{max}$. In other words, the predetermined first pressure band $\Delta_1$, starting from $D_{max}$, can extend to the same extent to higher and lower pressure signal values. In addition or alternatively, the predetermined second pressure band $\Delta_2$, which can also be referred to as the second tolerance range, can also be centered around the minimum pressure signal value $D_{min}$. This means, in other words, that the predetermined second pressure band $\Delta_2$, starting from $D_{min}$ can also extend to the same extent to higher and lower pressure signal values. In an advantageous manner, this creates a simple possibility for defining the pressure signal limits in the course of the plausibility check of the previously determined maximum and minimum pressure signal values $D_{max}$ and $D_{min}$. If appropriate, however, the predetermined first pressure band $\Delta_1$ and/or the predetermined second pressure band $\Delta_2$ can also be arranged eccentrically around the maximum or the minimum pressure signal value $D_{max}$ or $D_{min}$.

In addition or alternatively, the predetermined first pressure band $\Delta_1$ and/or the predetermined second pressure band $\Delta_2$ have a width that is defined on the basis of the determined maximum and/or minimum pressure signal values $D_{max}$ and/or $D_{min}$. For example, the predetermined first pressure band $\Delta_1$ can have a width—that can be described also as the first width—which is defined essentially as 0.2% of the maximum or minimum $D_{max}$ or $D_{min}$. Moreover, the predetermined second pressure band $\Delta_2$ can have a width—that can be described also as the second width—which is defined essentially as 0.2% of the maximum or minimum $D_{max}$ or $D_{min}$. In this case, the term "width" can be understood to mean in general a region between a respective upper and a lower pressure band limit value of the predetermined first or second pressure band $\Delta_1$ or $\Delta_2$. By defining the widths of the predetermined pressure bands $\Delta_1$ and $\Delta_2$ as a function of $D_{max}$ or $D_{min}$, a flexible adaptation of the predetermined pressure bands $\Delta_1$ and $\Delta_2$ to the respective level of the pressure signal values is achieved in an advantageous manner.

In addition or alternatively, the predetermined first pressure band $\Delta_1$ can also have the same width as the predetermined second pressure band $\Delta_2$. In other words, the first width can be equal to the second width. For example, both the first predetermined pressure band $\Delta_1$ and also the predetermined second pressure band $\Delta_2$ can have a width of 20 hPa. Alternatively, the predetermined first pressure band $\Delta_1$ can however also have a different width to that of the predetermined second pressure band $\Delta_2$ without abandoning the scope of the present disclosure.

According to a further aspect of the present disclosure, the first time segment $t_1$ can be shorter than the second time segment $t_2$. For example can be $t_1=0.3$ s and $t_2=0.5$ s. In addition or alternatively, the first time segment $t_1$ and/or the second time segment $t_2$ can also be longer than 0.1 s, preferably longer than 0.3 s, particularly preferably longer than 0.5 s. Preferably, however, in this case both the first time segment $t_1$ and the second time segment $t_2$ lie within the predetermined time interval of the pressure signal. In this regard, the inventors found that this definition advantageously makes it possible to achieve a good compromise between taking into account a large number of pressure signal values and updating the determined amplitude A as frequently as possible.

Furthermore, according to a further aspect of the present disclosure, the procedure of determining the amplitude A can include calculating the amplitude A on the basis of a, preferably sliding, mean absolute deviation of a plurality of pressure signal values of the provided pressure signal with respect to a sliding pressure signal mean value. The plurality of pressure signal values in this case are preferably successive pressure signal values. In other words, the absolute deviation with respect to the sliding pressure signal mean value can be calculated for a plurality of pressure signal values and the arithmetic mean of these absolute deviations can then be formed. In this case, the average of multiple pressure signal values that precede a "respective pressure signal value", in other words are temporally earlier, can be understood as a sliding or moving average pressure signal value, wherein the sliding pressure signal mean value shifts or moves with the "respective pressure signal value" under consideration. In other words, the sliding pressure signal mean value is always based on an equally long time series or on a fixed number of pressure signal values before a "respective pressure signal value". For example, the sliding pressure signal mean value can be determined on the basis of the arithmetic mean of the last 10 pressure signal values that precede a pressure signal value. In this case, the calculation of the amplitude A can also include the application of conversion, weighting and/or correction factors familiar to the person skilled in the art, preferably a multiplication by the factor $\pi/2$. In an advantageous manner, a reliable and simple-to-implement possibility of determining the amplitude A is thus also provided.

In order in turn to render it possible to perform a plausibility check in an advantageous manner, the checking procedure can further comprise determining a sum of signed deviations of the plurality of, preferably successive, pressure signal values of the pressure signal with respect to the sliding pressure signal mean value. In other words, the signed (i.e. positive or negative) distance of each pressure signal value of the plurality of pressure signal values with respect to the value of the moving pressure signal mean value that is associated with the respective pressure signal value can be determined and these signed distances can be summed. In the case of pressure signal values that are close in time or of an almost continuous pressure signal, the summation can also be understood as integration, as is immediately apparent to the person skilled in the art. As an alternative to determining the sum of signed deviations, it is also possible to calculate the mean deviation of the plurality of, preferably successive, pressure signal values of the pressure signal with respect to the sliding pressure signal mean value. In so doing, the amplitude A is preferably only then to be output if the sum (or integral) of signed deviations or the mean deviation is equal to 0 or less than a predetermined threshold value (for example 5 hPa). In other words, the provided pressure signal is to satisfy the predetermined plausibility criterion if the sum of signed deviations or, alternatively, the mean deviation is equal to 0 or less than a predetermined threshold value. This checking step advantageously ensures that the output amplitude value of the pump-induced fluid pressure fluctuation indicates the deviation with respect to quasi-stationary mean value or that a quasi-stationary state is present.

According to a further aspect of the present disclosure, calculating the amplitude A of the pump-induced fluid pressure fluctuation can further comprise calculating an associated value of the sliding pressure signal mean value with respect to each pressure signal value of the plurality of pressure signal values. In other words, it is possible with respect to each pressure signal value of the plurality of pressure signal values, to initially determine a separate value of the sliding pressure signal mean value. In this case, this associated or special value can be calculated on the basis of multiple pressure signals values that precede, preferably directly, the respective pressure signal value. For example, the respective associated values of the sliding pressure signal mean value can be calculated on the basis of the arithmetic mean of the last 8 pressure signal values that directly precede the respective pressure signal value. In connection with this, the procedure of calculating the amplitude A of the pump-induced fluid pressure fluctuation can also include calculating an absolute deviation of each pressure signal value of the plurality of pressure signal values with respect to the associated value of the sliding pressure signal mean value. In other words, it is possible to determine the absolute amount of the distance of each pressure signal value of the plurality of pressure signal values with respect to the value of the sliding pressure signal mean value that is associated with the respective pressure signal value. Furthermore, the procedure of determining the amplitude A of the pump-induced fluid pressure fluctuation can include calculating the arithmetic mean of the aforementioned calculated absolute deviations.

In order to advantageously compensate for noise or "outliers" in the provided pressure signal, it is possible according to a further aspect of the present disclosure, for the aforementioned plurality of pressure signal values to comprise at least 10, preferably 50, particularly preferably 100, successive pressure signal values. In so doing, it goes without saying that, in connection with this feature, the provided pressure signal is to actually also include a corresponding number of pressure signal values in the predetermined time interval. In addition or alternatively, the sliding pressure signal mean value can also be based on a previously defined number of pressure signal values. For example, the sliding pressure signal mean value can be based on the last 8 pressure signal values. In addition or alternatively, the sliding pressure signal mean value can also be based on pressure signal values in a previously defined time interval. In other words, the respective value of the sliding pressure signal mean value can be calculated on the basis of all the pressure signal values in a predetermined time period, for example the last 0.2 s. In both cases, the information relates in this case to the pressure signal value for which the respective value of the sliding pressure signal mean value is determined.

In order to also render possible an efficient amplitude determination procedure over a longer period of time, it is possible according to a further aspect of the present disclosure for the method to include a clocked operation in which the method is carried out at regular time intervals. Preferably, the regular time intervals each correspond to the predetermined time interval, wherein the predetermined time interval and/or the regular time intervals can only be 1 second for example. In other words, in the case of the clocked operation, the determined amplitude A of the pump-induced fluid pressure fluctuation can be output regularly after the regular time intervals have elapsed.

According to a further aspect of the present disclosure, the fluid that is regulated to a target fluid pressure $p_{soll}$ can be metered by means of a metering device. In other words, the fluid that is regulated to a target fluid pressure $p_{soll}$ can be in fluid connection with a metering device, for example in the form of a metering valve. Furthermore, the provided pressure signal can be a pressure signal during an operating phase of the metering device in which metering does not take place. In an advantageous manner, it is possible as a consequence to avoid influences of the metering system on the pressure signal (for example pressure drops when opening and/or bouncing effects when closing the metering valve), which could falsify an amplitude determination. In this context, the provided pressure signal in the monitoring step can satisfy the predetermined plausibility criterion if the pressure signal was detected during an operating phase of the metering device in which metering does not take place.

Furthermore, in order to render possible the most reliable and interference-free amplitude determination procedure possible, it is possible in accordance with a further aspect of the present disclosure for the provided pressure signal to be a pressure signal during an idling phase and/or a part-load phase of the pump. In this case, the idle phase is to be essentially a zero load phase of the pump, for example an operating phase in which metering is currently not taking place. In addition or alternatively, the provided pressure signal can also be a pressure signal during an operating phase of the pump in which a pump speed between 10-30%, preferably between 15-25%, particularly preferably between 18-22%, of the maximum pump speed is present. The maximum pump speed is to be a maximum possible and/or maximum permissible pump speed. Additionally or alternatively, the provided pressure signal can also be a pressure signal during an operating phase of the pump in which the fluid pressure does not deviate by more than 5%, preferably not more than 2%, particularly preferably not more than 1%, with respect to the target fluid pressure $p_{soll}$. The provided pressure signal is thus preferably a pressure signal that was recorded in the predetermined time interval, if possible under unchanged system conditions (pump speed, amount of fluid, etc.). The aforementioned conditions can in turn be used in each case individually or in combination as a predetermined plausibility criterion. For example, the provided pressure signal can thus satisfy the predetermined plausibility criterion if the pressure signal is a pressure signal during an idling phase and/or a partial load phase of the pump.

Furthermore, an apparatus is provided in accordance with the present disclosure for determining an amplitude A of a pump-induced fluid pressure fluctuation of a fluid, wherein the fluid is regulated by means of pump to a target fluid pressure $p_{soll}$. In this case, the apparatus is configured so as to perform a method as described in this document. For this purpose the apparatus can comprise a processor and a memory storage device. In an advantageous manner, for this purpose the memory storage device holds instructions are can be implemented by the processor, whereby the apparatus is overall in the position to perform the previously described method. For example, the apparatus for determining an amplitude A of a pump-induced fluid pressure fluctuation of a fluid can be a control unit of a motor vehicle. Alternatively, the apparatus for determined an amplitude A of a pump-induced fluid pressure fluctuation of a fluid can however also be a computing device external to the vehicle.

In order in an advantageous manner to also immediately detect the pressure signal that is required to determine the amplitude, the apparatus can in this case also comprise a sensor device which is configured so as to detect and provide the pressure signal. In this case, the sensor device can preferably be configured so to detect and provide a fluid pressure of a fluid (for example a reducing agent for exhaust gas aftertreatment) that is regulated to a target fluid pressure $p_{soll}$. For example, the sensor device in this context can be a piezoresistive, piezoelectric, capacitive and/or inductive pressure sensor.

Moreover, a motor vehicle is also provided in accordance with the present disclosure. Said motor vehicle comprises in this case an apparatus for determining an amplitude A of a pump-induced fluid pressure fluctuation of a fluid, as described in this document. Moreover, the motor vehicle can comprise a pump (for example a toothed wheel pump), by means of which preferably a fluid pressure of the fluid can be regulated to a target fluid pressure $p_{soll}$. It is preferred that the fluid in this case is a reducing agent for exhaust gas aftertreatment, wherein also other fluids, including for example oil, fuel and/or cooling water, can be used without abandoning the scope of the present disclosure.

The previously described aspects and advantages of the present disclosure can be combined in any manner with one another. Further details and advantages of the present disclosure are described below with reference to the attached drawings. In the drawings.

Figure 5:
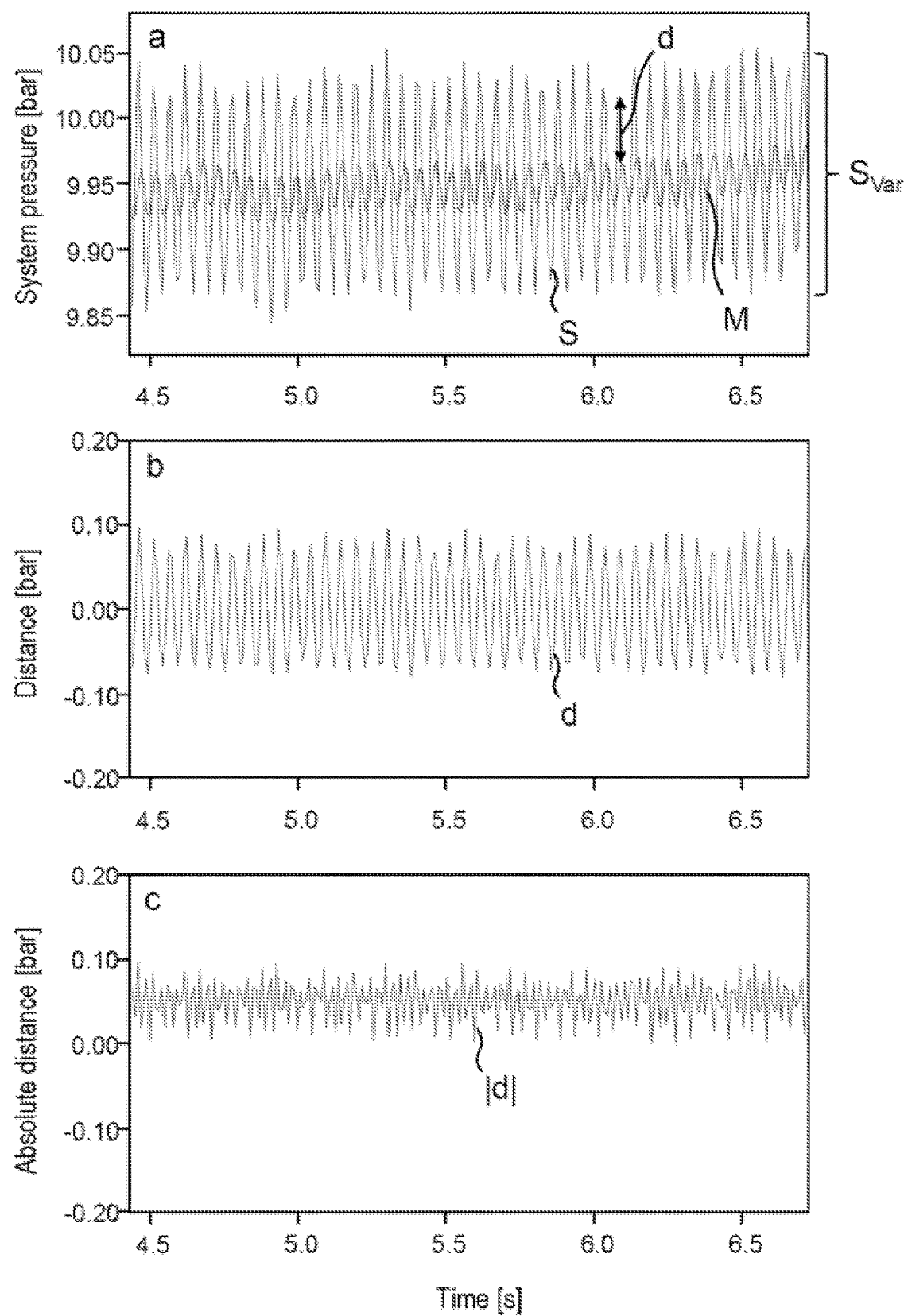
Figure 6:
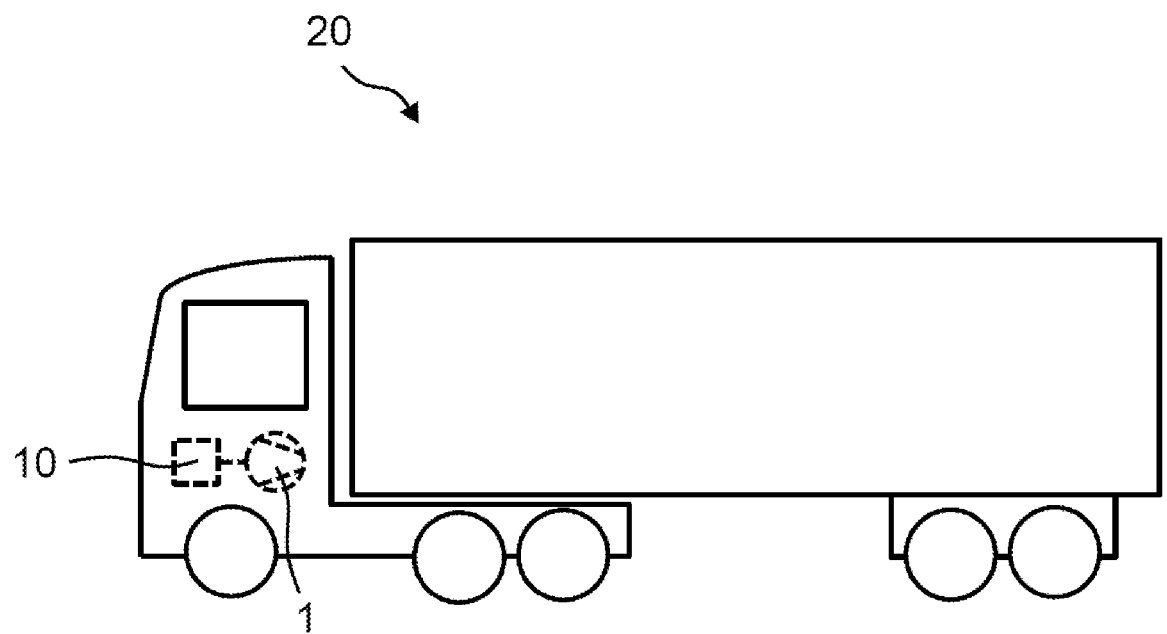

FIG. 5 shows a schematic representation that illustrates the method steps of the determining and checking procedures in accordance with a second embodiment of the present disclosure; and FIG. 6 shows a schematic representation of a motor vehicle having an apparatus for determining an amplitude A of a pump-induced fluid pressure fluctuation of a fluid in accordance one embodiment of the present disclosure.

Like or functionally equivalent elements are denoted in all the figures by the same reference numerals and in part are not described separately.

Figure 1:
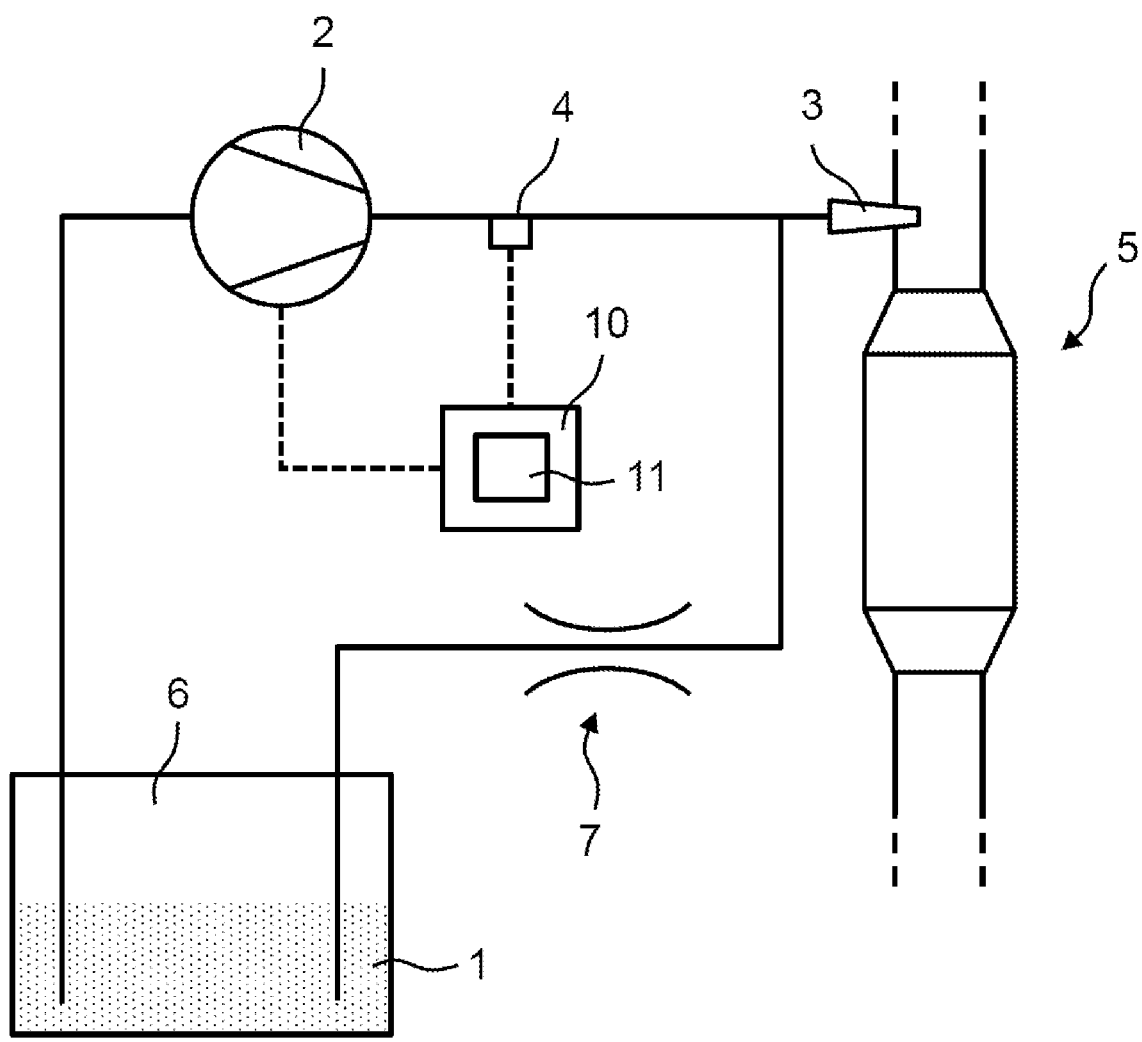
FIG. 1 shows a schematic representation of a system for the exhaust gas aftertreatment of a motor vehicle, comprising an apparatus for determining an amplitude A of a pump-induced fluid pressure fluctuation of a fluid in accordance with an embodiment of the present disclosure.

FIG. 1 illustrates a schematic representation of a system for the exhaust gas aftertreatment of a motor vehicle 20, comprising an apparatus 10 for determining an amplitude A of a pump-induced fluid pressure fluctuation $S_{Var}$ of a fluid 1 (in this case for example a reducing agent) in accordance one embodiment of the present disclosure. Fundamentally, the system has for the exhaust gas aftertreatment in this case a tank 6 for storing and/or providing a, preferably liquid, reducing agent (for example ammonia or aqueous urea solution). Reducing agent can be removed from this tank 6 by means of the pump 2, which is in fluid connection with the tank 6 by way of corresponding conveying lines, and conveyed (likewise by way of corresponding conveying lines) to a metering device 3 in the form of a metering valve. In other words, the pump 2 can be in fluid connection with the tank 6 on the input side and with the metering device 3 on the output side.

By means of the metering device 3, the reducing agent can then be introduced or sprayed into exhaust gas flow that is conveyed in the exhaust gas tract 5. In this case, in addition to the configuration of the metering device 3 itself, the reducing agent pressure that is applied at the metering device 3 is also decisive for regulating the metering parameters (amount, spray jet shape, etc.). A procedure of regulating this reducing agent pressure to a predetermined target pressure $p_{soll}$ can take place, for example, by way of a corresponding control or regulation procedure of the pump rotational speed. For this purpose, the system for exhaust gas aftertreatment can comprise a control unit 11, which is preferably configured together with the apparatus 10 as a structural unit for the amplitude determination. This control unit 11 can provide a pressure signal S (cf. FIG. 2), wherein the pressure signal S can be a prevailing fluid pressure of the reducing agent and/or can be a variable from which the prevailing fluid pressure of the reducing agent can be derived.

So as to provide the relevant pressure signal S, the system that is illustrated in FIG. 1 comprises for the exhaust gas aftertreatment a sensor device 4 that is arranged on the output side of the pump 2 and is configured so as to detect and provide the relevant pressure signal S. On the basis of this pressure signal S and by means of a regulating method—already known in the prior art—the control unit 11 can then be embodied so as to output relevant control signals to the pump 2 in order thereby to regulate the pump rotational speed and consequently the pressure of the reducing agent on the output side. In addition, the reducing agent pressure can also be regulated by way of an optional return line—shown here—to the tank 6 with a restrictor 7 that is arranged there.

In addition to controlling the pump speed so as to regulate the reducing agent pressure, the pressure signal S that is detected and provided by the sensor device 4 (see FIG. 2) is also used to determine and check the plausibility of the amplitude A of the pump-induced fluid pressure fluctuation $S_{Var}$ of the reducing agent. For this purpose, the system for the exhaust gas aftertreatment has a corresponding apparatus 10 for determining an amplitude A of a pump-induced fluid pressure fluctuation $S_{Var}$ of a fluid 1, which is regulated to a target fluid pressure $p_{soll}$ by means of a pump 2, in accordance with one embodiment of the present disclosure. This apparatus 10, which can be embodied, for example, as part of a control unit of the motor vehicle 20, is configured in this case so as to perform a method that is described in greater detail below—with reference to FIG. 4. The apparatus 10 can in this case comprise for example a programmed microprocessor and a corresponding memory storage device. In an advantageous manner, the memory storage device holds instructions are can be implemented by the processor, as a result of which the apparatus 10 is overall in the position to perform the previously described method.

Figure 2:
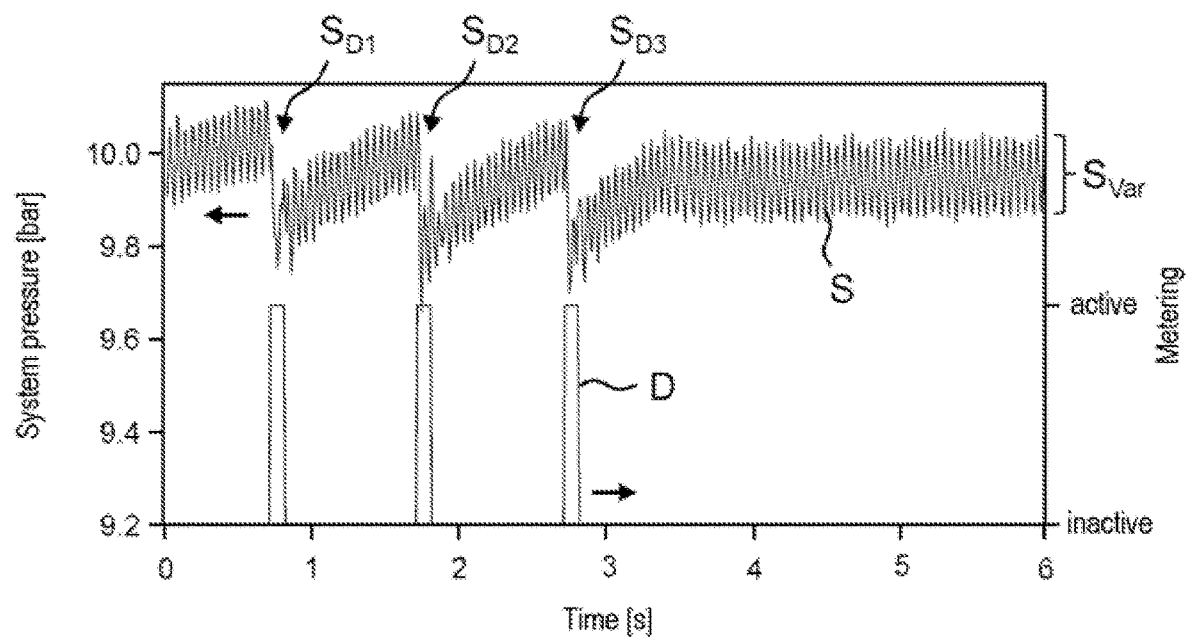
FIG. 2 shows exemplary measurement values of a pressure signal of a fluid as a function of time, and said pressure signal can be used for determining in accordance with the present disclosure an amplitude A of a pump-induced fluid pressure fluctuation of a fluid.

FIG. 2 illustrates exemplary measurement values of a pressure signal S of a fluid 1 as a function of time, and said pressure signal can be used for determining the amplitude A of a pump-induced fluid pressure fluctuation $S_{Var}$ of a fluid 1. For example, the illustrated pressure signal may have been detected and provided by means of the sensor device 4 that is illustrated in FIG. 1. In this case, FIG. 2 illustrates the time course of the pump output-side fluid pressure of a fluid 1 during three short metering processes (cf. logical metering signal D), wherein the fluid pressure is regulated by varying the pump rotational speed to a target fluid pressure $p_{soll}$ of almost 10 bar. In addition to the brief pressure drops $S_{D1}$, $S_{D2}$, $S_{D3}$ of about 0.2 bar while metering is taking place, the dynamic change (=pump-induced fluid pressure fluctuation $S_{Var}$) in the fluid pressure around $p_{soll}$ that is caused by the periodic pump movement can also be seen in FIG. 2. In this case, the reliable determination of the amplitude A, in other words the size, of this pump-induced fluid pressure fluctuation $S_{Var}$ is the subject of the method initially described in general with reference to FIG. 4.

Figure 3:
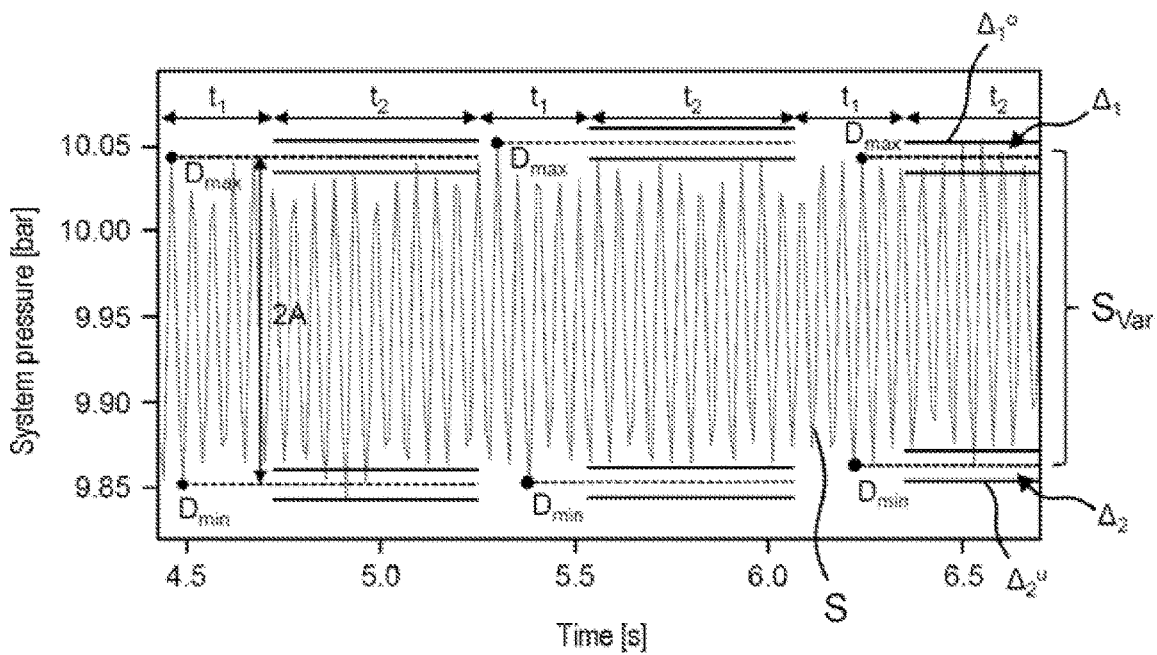
FIG. 3 shows a schematic representation that illustrates the method steps of determining and checking procedures in accordance with a first embodiment of the present disclosure.
Figure 4:
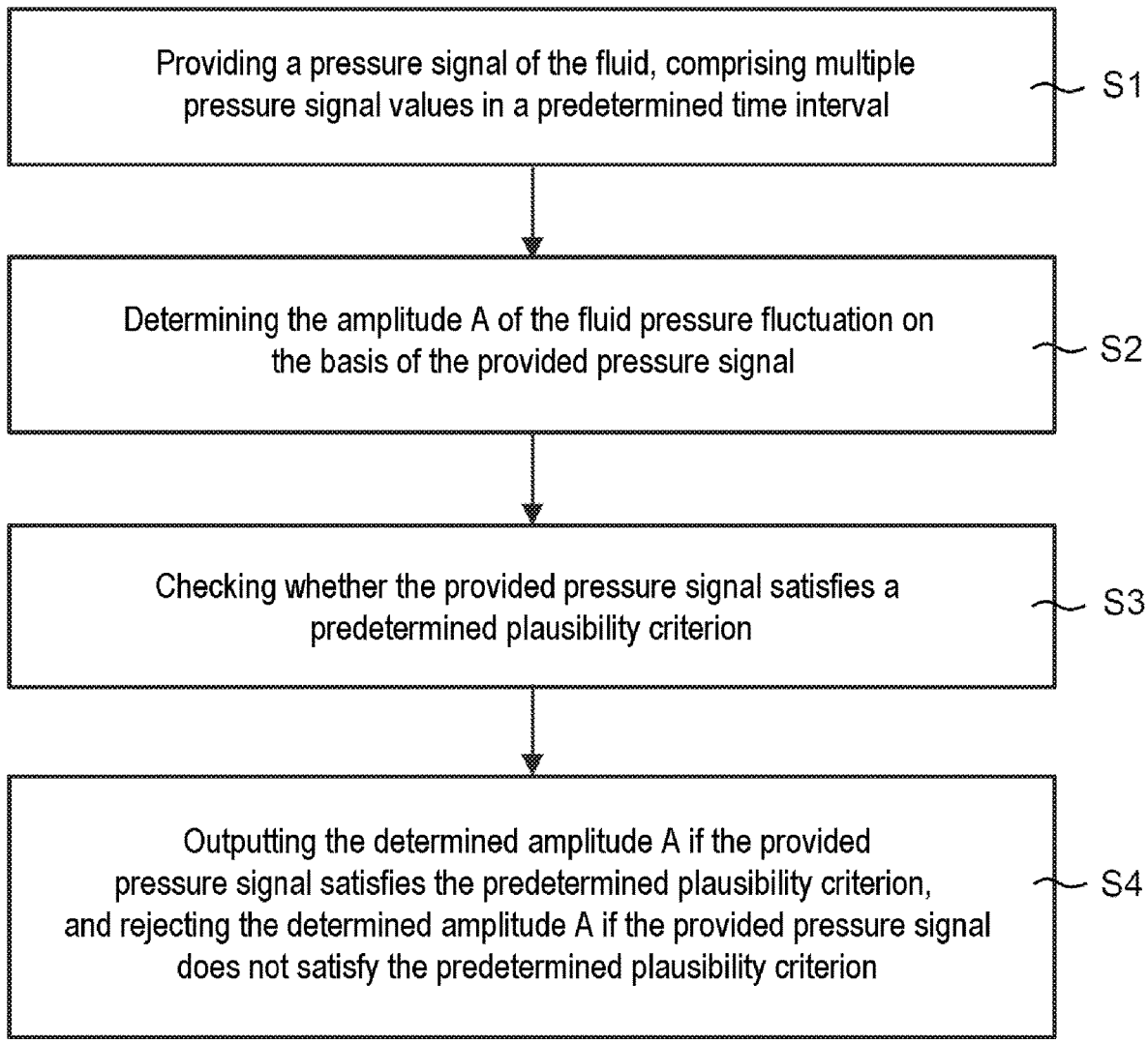
FIG. 4 shows a flow diagram so as to illustrate the method for determining an amplitude A of a pump-induced fluid pressure fluctuation of a fluid in accordance with one embodiment of the present disclosure.

FIG. 4 illustrates a flow diagram for illustrating a method for determining an amplitude A of a pump-induced fluid pressure fluctuation $S_{Var}$ of a fluid 1, which is regulated to a target fluid pressure $p_{soll}$ by means of a pump 2, in accordance with one embodiment of the present disclosure. The fluid 1 can be, for example, a reducing agent for exhaust gas aftertreatment, such as for example ammonia or aqueous urea solution. In step S1, a pressure signal S of the fluid is provided, comprising a plurality of pressure signal values in a predetermined time interval. In this case, the pressure signal S can indicate a fluid pressure of the fluid 1 and/or be a variable from which the fluid pressure of the fluid 1 can be derived. For example, the provided pressure signal S in a predetermined time interval can be the curve illustrated in FIG. 2. In step S2, the amplitude A of the fluid pressure fluctuation $S_{Var}$ is determined on the basis of the provided pressure signal S, for example, on the basis of a difference between a maximum pressure signal value $D_{max}$ and a minimum pressure signal value $D_{min}$ of the provided pressure signal S, wherein possible calculation rules for determining the amplitude will be discussed in detail in connection with the description of FIGS. 3 and 5. In step S3, a check is subsequently performed as to whether the provided pressure signal S satisfies a predetermined plausibility criterion. Accordingly, this step can also be referred to as a validation and/or a plausibility check in order to thereby identify obvious inaccuracies in the amplitude determination procedure in step S2. For example, the predetermined plausibility criterion can also include the condition as to whether the pressure signal S has just not been detected during a metering process that greatly falsifies the pressure curve. Then, in step S4, the determined amplitude A is output if the provided pressure signal S satisfies the plausibility criterion. However, if the provided pressure signal S does not satisfy the plausibility criterion, the determined amplitude A is rejected in step S4.

In connection with the above-mentioned method steps of determining (S2) and checking (S3), FIG. 3 shows a schematic representation which illustrates these method steps in accordance with a first embodiment of the present disclosure. In this case, a maximum and minimum pressure signal value $D_{max}$ and $D_{min}$ of the provided pressure signal S is initially determined within a first time segment $t_1$ ($t_1 \approx 0.3$ s). In other words, the largest and smallest pressure signal value is determined within the first time segment $t_1$ of the pressure signal S. On the basis of these values, it is possible to calculate the amplitude A for example by way of $A = |D_{max} - D_{min}|/2$. Alternatively, however, other calculation rules, such as for example the geometric mean of $D_{max}$ and $D_{min}$ can be used.

Then, within a second time segment $t_2$ ($t_2 \approx 0.5$ s) that follows the first time segment $t_1$ (in this case immediately adjoining), a first number $N_1$ of pressure signal values is determined which are within a first pressure band $\Delta_1$ ($\Delta_1 \approx 20$ mbar) around the maximum pressure signal value $D_{max}$ and a second number $N_2$ of pressure signal values is determined which lie within a second pressure band $\Delta_2$ ($\Delta_2 \approx 20$ mbar) around the minimum pressure signal value $D_{min}$. In this context, the first and second pressure band $\Delta_1$, $\Delta_2$ can thus also be referred to as the first and second tolerance range, respectively. In so doing, if the determined first number $N_1$ exceeds a first threshold value $S_1$ (for example $S_1=3$) and the determined second number $N_2$ exceeds a second threshold value $S_2$ (for example $S_1=3$) (plausibility criterion), the previously determined amplitude A is to be the output (S5). For this purpose, the method includes the step of checking whether the pressure signal S that is provided satisfies a predetermined plausibility criterion. In other words, it is possible thereby to perform a check or validation as to whether the previously determined amplitude (estimated) value is actually a representative value for the prevailing system state with the result that overall the reliability of the method is increased.

In order to increase this even further, the aforementioned checking procedure can also include determining whether within the second time segment $t_2$ at least one pressure signal value is above the predetermined first pressure band $\Delta_1$ around the maximum pressure signal value $D_{max}$ and/or whether at least one pressure signal value is below the predetermined second pressure band $\Delta_2$ around the minimum pressure signal value $D_{min}$. This means, in other words, the plausibility criterion also includes in addition the condition that within the second time segment $t_2$ there is no pressure signal value with a value greater than the upper pressure band limit value $\Delta_1^o$ of the predetermined first pressure band $\Delta_1$ and/or less than the lower pressure band limit value $\Delta_2^u$ of the predetermined second pressure band $\Delta_2$. If so, the determined amplitude A is not to be output and instead is to be rejected. In addition, the plausibility criterion can also include further conditions, for example a check can be performed as to whether the pressure signal S does not include any pressure drops or other artifacts which falsify the amplitude determination. Overall, the aforementioned plausibility check can advantageously increase the reliability of the amplitude determination procedure, wherein the amplitude determination procedure in turn can form the basis for a further diagnosis of the fluid system. Information regarding the rigidity of the system and thus information regarding the possible presence of leaks or other malfunctions in the system can thus be obtained from the determined or output amplitude A.

FIG. 5 shows a schematic representation that illustrates the method steps of the determining procedure (S2) and checking procedure (S3) in accordance with a second embodiment of the present disclosure. For this purpose, the same pressure signal range as discussed above in connection with FIG. 3 is shown in diagram a of FIG. 5. In lieu of the subdivision into the time segments $t_1$ and $t_2$, the sliding pressure signal mean value M forms the basis for determining the amplitude. The sliding pressure signal mean value M represents in this case the average of multiple pressure signal values—in the current case the last 10—preceding a "respective pressure signal value", in other words temporally earlier, pressure signal values. In this case, the sliding pressure signal mean value M shifts or moves with the respectively considered "respective pressure signal value" with the result that always the same number of pressure signal values (in this case 10) are included in the calculation of the respective value of the sliding pressure signal mean value M.

The amplitude A is then determined on the basis of the mean absolute deviation of the pressure signal values of the pressure signal S with respect to the sliding pressure signal mean value M. To this end, initially the deviation or the distance d (indicated by the double arrow) of each pressure signal value of the pressure signal S is determined with respect to a value, which is associated with the respective pressure signal value, of the sliding pressure signal mean value M, wherein the result of this arithmetic operation is illustrated for example in diagram b of FIG. 5. Then the absolute amount |d| of the respective values of the distance d, which is shown in diagram c, is formed. Based on this, the arithmetic mean of a plurality (in the present case, for example 100) of these absolute values |d| is formed, which in the present case includes the respective summation of the last 100 absolute values |d| and then dividing by the number of summands (here 100). Alternatively, however, the plurality can also comprise a different number of values, for example 50 or 200. The conversion into an amplitude value is then carried out by multiplying by the factor $\pi/2$.

Analogous to the sliding pressure signal mean value M, in this case the mean absolute deviation of the pressure signal values can also be calculated in a sliding or moving manner. In other words, a mean absolute deviation can be calculated at multiple, preferably successive, points of the pressure signal S, wherein the same number of temporally earlier absolute deviations are included in the calculation of the respective value of the sliding mean absolute deviation. In other words, a quasi-continuous calculation of the mean absolute deviation and thus a quasi-continuous determination of the amplitude A can take place, wherein in this context the above mentioned summation can also be understood as integration.

The plausibility check or the checking as to whether the pressure signal S that is provided satisfies a predetermined plausibility criterion can take place according to this embodiment on the basis of the distance d (diagram b). For this purpose, the step of checking (S3) can include determining a sum of a plurality of, preferably successive, values of the distance d. In other words, the checking procedure can include determining a sum of signed deviations of the plurality of pressure signal values of the pressure signal S with respect to the moving pressure signal mean value M. In this case, the amplitude A is preferably only then to be output if the sum of signed deviations is equal to 0 or less than a predetermined threshold value (for example. 5 mbar). In other words, the provided pressure signal S is to satisfy the predetermined plausibility criterion if the sum of signed deviations is equal to 0 or less than a predetermined threshold value. In this case, this checking step advantageously ensures that the output amplitude value of the pump-induced fluid pressure fluctuation $S_{Var}$ indicates the deviation with respect to a quasi-stationary mean value or that a quasi-stationary state is present.

FIG. 6 illustrates a schematic representation of a motor vehicle 20 having an apparatus 10 for determining an amplitude A of a pump-induced fluid pressure fluctuation $S_{Var}$ of a fluid 1, which is regulated to a target fluid pressure $p_{soll}$ by means of a pump 2, in accordance with one embodiment of the present disclosure. In the present case, the motor vehicle 20 is an articulated vehicle, in other words a combination of a tractor unit and a semi-trailer. In this case, the motor vehicle 20 comprises, inter alia, a pump 2, wherein a fluid pressure of a fluid 2, preferably a fluid pressure of a reducing agent for exhaust gas aftertreatment, is regulated to a target fluid pressure $p_{soll}$ by means of the pump 2. For example, the fluid pressure can be regulated in this case by varying the pump speed. In addition, the motor vehicle 20 comprises a device 10 for determining the pump-induced fluid pressure fluctuation $S_{Var}$ of the fluid 1, preferably for determining the pump-induced fluctuation in the reducing agent pressure. The apparatus 10 is configured in this case so as to perform a method as described in this document. For this purpose, the apparatus 10 can also comprise a sensor device 4 which is configured so as to detect and provide the corresponding pressure signal. For example, the apparatus 10 can comprise a pressure sensor 4 for this purpose.

Although the present disclosure includes reference to specific exemplary embodiments, it is evident to the person skilled in the art that different changes can be performed and equivalents used as alternatives without abandoning the scope of the present disclosure. As a consequence, the present disclosure is not to be limited to the disclosed exemplary embodiments but rather is to include all exemplary embodiments that fall into the scope of the attached claims. In particular, the present disclosure also claims protection for the subject matter and the features of the subordinate claims independently from the claims included by reference.

LIST OF REFERENCE NUMERALS

1 Fluid
2 Pump
3 Metering device
4 Sensor device
5 Exhaust gas tract
6 Tank
7 Restrictor
10 Apparatus for determining the rotational speed
11 Control unit
20 Motor vehicle
$S_{D1}, S_{D2}, S_{D3}$ Pressure drops
D Metering signal
d Distance
|d| Absolute amount of the distance
M Sliding pressure signal mean value
S Pressure signal
$S_{Var}$ Pump-induced fluid pressure variation
$\Delta_1^o$ Upper pressure band limit value
$\Delta_2^u$ Lower pressure band limit value

The invention claimed is:

1. A method for determining an amplitude A of a pump-induced fluid pressure fluctuation of a fluid that is regulated by means of a pump to a target fluid pressure $p_{soll}$, comprising the steps:
providing a pressure signal of the fluid that comprises multiple pressure signal values in a predetermined time interval;

determining the amplitude A of the pump-induced fluid pressure fluctuation on the basis of the provided pressure signal;

checking whether the provided pressure signal satisfies a predetermined plausibility criterion; and outputting the determined amplitude A if the provided pressure signal satisfies the predetermined plausibility criterion and rejecting the determined amplitude A if the provided pressure signal does not satisfy the predetermined plausibility criterion.

2. The method as claimed in claim 1, characterized in that:

the pump-induced fluid pressure fluctuation of a fluid is periodic; or the plausibility criterion characterizes a quasi-stationary state.

3. The method as claimed in claim 1, characterized in that:

a) the fluid is a reducing agent for exhaust gas treatment; or b) the pump-induced fluid pressure fluctuation is a periodic and/or sinusoidal fluid pressure oscillation that is caused by the operation of the pump; or c) the method includes determining a system rigidity on the basis of the determined and/or output amplitude A.

4. The method as claimed in claim 1, characterized in that the procedure of determining the amplitude A includes the steps:

determining a maximum and minimum pressure signal value $D_{max}$ and $D_{min}$ of the provided pressure signal within a first time segment $t_1$ of the predetermined time interval; and calculating the amplitude A on the basis of the determined maximum and minimum pressure signal values $D_{max}$ and $D_{min}$.

5. The method as claimed in claim 4, characterized in that the checking procedure includes the following steps:

determining a first number $N_1$ of pressure signal values which lie within a second time segment $t_2$ that follows the first time segment $t_1$ in a predetermined first pressure band $\Delta_1$ around the maximum pressure signal value $D_{max}$; or determining a second number $N_2$ of pressure signal values which lie within the second time segment $t_2$ in a predetermined second pressure band $\Delta_2$ around the minimum pressure signal value $D_{min}$; and that the provided pressure signal satisfies the predetermined plausibility criterion if the first number $N_1$ exceeds a first threshold value $S_1$ and/or the second number $N_2$ exceeds a second threshold value $S_2$.

6. The method as claimed in claim 5, characterized in that the checking procedure includes the following steps:

a1) determining whether within the second time segment $t_2$ at least one pressure signal value lies above the predetermined first pressure band $\Delta_1$ around the maximum pressure signal value $D_{max}$; or a2) determining whether within the second time segment $t_2$ at least one pressure signal value lies below the predetermined second pressure band $\Delta_2$ around the minimum pressure signal value $D_{min}$; and b) that the provided pressure signal satisfies the predetermined plausibility criterion if no pressure signal value is above the predetermined first pressure band $\Delta_1$ around the maximum pressure signal value $D_{max}$ and/or no pressure signal value is below the predetermined second pressure band $\Delta_2$ around the minimum pressure signal value $D_{min}$.

7. The method as claimed in claim 5, characterized in that:

a) the predetermined first pressure band $\Delta_1$ is centered around the maximum pressure signal value $D_{max}$ and the predetermined second pressure band $\Delta_2$ is centered around the minimum pressure signal value $D_{min}$; or b) the predetermined first pressure band $\Delta_1$ and/or the predetermined second pressure band $\Delta_2$ have a width that is defined on the basis of the determined maximum and/or minimum pressure signal values $D_{max}$ and/or $D_{min}$; or c) the predetermined first pressure band $\Delta_1$ has the same width as the predetermined second pressure band $\Delta_2$.

8. The method as claimed in claim 7, characterized in that the predetermined first pressure band $\Delta_1$ and/or the predetermined second pressure band $\Delta_2$ have a width defined essentially as 0.2% of the maximum or minimum $D_{max}$ or $D_{min}$.

9. The method as claimed in claim 5, characterized in that:

a) the first time segment $t_1$ is shorter than the second time segment $t_2$; or b) the first time segment $t_1$ and/or the second time segment $t_2$ is longer than 0.1 s.

10. The method as claimed in claim 9, characterized in that the first time segment $t_1$ and/or the second time segment $t_2$ is longer than 0.5 s.

11. The method as claimed in claim 1, characterized in that the procedure of determining the amplitude A includes the following step:

calculating the amplitude A on the basis of a mean absolute deviation of a plurality of pressure signal values of the provided pressure signal with respect to a sliding pressure signal mean.

12. The method as claimed in claim 11, characterized in that the mean absolute deviation is a sliding mean absolute deviation.

13. The method as claimed in claim 11, characterized in that the checking procedure includes the following step:

determining a sum of signed deviations of the plurality of pressure signal values of the pressure signal with respect to the sliding pressure signal mean value; and that the provided pressure signal satisfies the predetermined plausibility criterion if the sum of signed deviations is equal to 0 or less than a predetermined threshold value.

14. The method as claimed in claim 13, characterized in that the plurality of pressure signal values includes a plurality of successive pressure signal values.

15. The method as claimed in claim 11, characterized in that the procedure of calculating the amplitude A includes the following steps:

calculating an associated value of the sliding pressure signal mean value with respect to each pressure signal value of the plurality of pressure signal values on the basis of multiple pressure signal values that precede the respective pressure signal value; and calculating an absolute deviation of each pressure signal value of the plurality of pressure signal values with respect to the associated value of the sliding pressure signal mean value.

16. The method as claimed in claim 15, characterized in that the multiple pressure signal values directly precede the respective pressure signal value.

17. The method as claimed in claim 11, characterized in that a) the plurality of pressure signal values comprise at least 10 successive pressure signal values; or b) the sliding pressure signal mean value is based on a previously specified number of pressure signal values and/or on pressure signal values in a specified time interval.

18. The method as claimed in claim 17, characterized in that the plurality of pressure signal values comprise at least 100 successive pressure signal values.

19. The method as claimed in claim 1, characterized in that the method includes a clocked operation in which the method is carried out at regular time intervals.

20. The method as claimed in claim 19, characterized in that:
   a) the regular time intervals correspond to the predetermined time interval; or
   b) the determined amplitude A of the pump-induced fluid pressure fluctuation is output after the regular time intervals have elapsed.

21. The method as claimed in claim 1, characterized in that the fluid that is regulated to a target fluid pressure $p_{soll}$ can be metered by means of a metering device and the provided pressure signal is a pressure signal during an operating phase of the metering device in which metering does not take place.

22. An apparatus for determining an amplitude A of a pump-induced fluid pressure fluctuation of a fluid, wherein the apparatus is configured so as to perform a method as claimed in claim 1.

23. The apparatus of claim 22 further comprising a sensor device which is configured so as to detect and provide the pressure signal.

24. A motor vehicle, comprising an apparatus for determining an amplitude of a pump-induced fluid pressure fluctuation of a fluid, as claimed in claim 22.

* * * * *